United States Patent [19]

Baum et al.

[11] 4,068,616
[45] Jan. 17, 1978

[54] APPARATUS FOR TREATING PLASTIC FILM

[75] Inventors: Sidney J. Baum, Encino; Anton J. Mayr, Canoga Park, both of Calif.

[73] Assignee: Foster Grant Co., Inc., Leominster, Mass.

[21] Appl. No.: 683,147

[22] Filed: May 4, 1976

Related U.S. Application Data

[62] Division of Ser. No. 308,633, Nov. 21, 1972, Pat. No. 3,992,141.

[51] Int. Cl.² .............................................. B05C 3/12
[52] U.S. Cl. .............................. 118/8; 118/115; 118/419; 118/423; 118/427
[58] Field of Search ............... 118/427, 115, 424, 419, 118/6, 414, 8, 405, 423; 68/202, 200, 208; 354/298, 325, 321, 322; 427/353, 434

[56] References Cited

U.S. PATENT DOCUMENTS

| | | | |
|---|---|---|---|
| 1,443,975 | 2/1923 | Caldwell | 118/419 |
| 1,895,760 | 1/1933 | Hunt | 354/298 |
| 2,964,825 | 12/1960 | Cocker | 118/419 X |
| 3,203,392 | 8/1965 | Edwards | 118/115 |
| 3,587,525 | 6/1971 | Fleischer | 118/115 |

Primary Examiner—John P. McIntosh
Attorney, Agent, or Firm—Beveridge, De Grandi, Kline & Lunsford

[57] ABSTRACT

A running length of plastic film is processed by submerging a bight of the film in a bath of treatment liquid and drawing the film longitudinally therethrough by a pair of pinch rolls mounted closely adjacent and parallel to the top surface of the treatment liquid. The pinch rolls mechanically remove adhering droplets of the treatment liquid from the film as it emerges from the bath to thereby prevent non-uniform treatment. The film is washed as it emerges from the nip of the pinch rolls by flowing a rinsing liquid into the exit nip and along the axes of the rolls, and means are provided to prevent mixing the rinsing liquid with the treatment liquid. A property of the treated film, e.g., its light transmissions is continuously monitored and the time of submersion of the film in the treatment liquid is varied in accordance with the monitored property to assure uniform treatment.

9 Claims, 5 Drawing Figures

FIG. 1
FIG. 2
FIG. 3

APPARATUS FOR TREATING PLASTIC FILM

This is a division of application Ser. No. 308,633 filed Nov. 21, 1972, now U.S. Pat. No. 3,992,141.

This invention relates to an improved method of and apparatus for processing plastic film, and more particularly to such a method and apparatus for continuously processing a running length of non-porous, non-absorptive plastic film to alter a property, for example, the transparency, of the film. The invention is particularly useful in the manufacture of optical polarizers from laminated sheets of plastic film wherein iodine or a dichroic dye is used to stain a stretch-oriented plastic film to achieve the desired polarizing effect, and will be described herein with specific reference to the processing of such film, it being understood that the invention is not so limited.

In the manufacture of optical polarizing sheets used, for example, in the production of sun glasses, polarizers, or the like, difficulty has been encountered in obtaining uniform optical dye shading of the stretch-oriented plastic film. This results, at least in part, from the tendency of globules or droplets of the staining and/or fixing solutions to be retained on the surface of the film as it emerges from the staining and fixing baths since such droplets of liquid continue to react with the film in a non-uniform manner. The longer the delay in removing the adhering liquid, the greater the non-uniformity of the staining or dyeing effect.

While uniform staining of the plastic film is obviously necessary in order to obtain optical uniformity, the influence of rapid removal of any adhering dyeing or fixing liquids from the surface of the film being treated on the ability to obtain such uniformity has not, in the past, been fully appreciated or recognized, with the result that such adhering liquid has normally been permitted to remain in contact with the film for substantial periods as from step to step in the treating process.

In order to obtain optical uniformity in accordance with the present invention, the time between emergence of the film from the bath and the removal of excess adherent treatment liquid is held at a minimum by initially mechanically rolling the film surface to remove as much of the excess adhering liquid as possible, then quickly washing any remaining adhering liquid from the surface of the film. This is accomplished by withdrawing the film vertically upward from the bath through the nip of a pair of small diameter, rubber convered pinch rolls mounted as close as practical to the upper surface of the treatment liquid whereby the film, emerging from the bath, passes immediately into the nip of the rolls causing any adhering droplets to be mechanically rolled therefrom. The ends of the pinch rolls extend laterally over the edges of the treatment bath container, and a rinsing liquid is flowed into the upper, exit nip of the rolls to rinse any trace of the adhering liquid not mechanically removed by the pinch rolls. The rinsing liquid flows axially along the pinch rolls and is discharged from the ends thereof.

The term "mechanically rolled" is sometimes used herein to describe the action of the pinch rolls in removing the adhering droplets of liquid from the film surface to distinguish this action from the normal wringing or squeezing action of conventional extracting rolls employed to extract liquid from porous material such as textile fabrics. The film is, of course, under pressure as it passes through the nip of the pinch rolls; however, the adhering droplets do not enter this nip, but rather are pushed, or rolled, from the non-absorptive surface as the film is pulled between the rolls.

To prevent the rinsing liquid from mixing with and diluting the treatment bath, a second pair of rolls is provided, one engaging each of the rubber covered rolls. This pair of rolls mechanically prevents rinsing liquid from being carried around the rubber covered surface. Suitable means may also be provided to prevent liquid discharged from the end of the rubber covered roll from running or crawling back along the under surface thereof and droping into the treatment liquid.

In order to assure uniform dyeing of the film, a light source downstream from the excess dye removing unit directs a beam of light through the film and onto a photoelectric unit. The photoelectric unit is calibrated to measure the amount of light penetrating the moving film, and to generate an electrical signal which is proportional to the amount of light sensed. The electric signal is employed either to generate a visual indication of light transmitted by the film to permit manual adjustment of the time in which the film is subject to the dyeing bath, or to automatically adjusting the submersion time.

Other features and advantages of the present invention will be more fully realized and understood from the following detailed description, taken in conjunction with the accompanying drawings, in which:

FIG. 1 is an elevational view, in section, schematically illustrating an improved apparatus for processing film in accordance with the method of this invention;

FIG. 2 is an enlarged detailed view of a portion of the apparatus shown in FIG. 1;

FIG. 3 is an end elevation view, in section, of the apparatus shown in FIG. 2;

Figures 1, 2, 3:
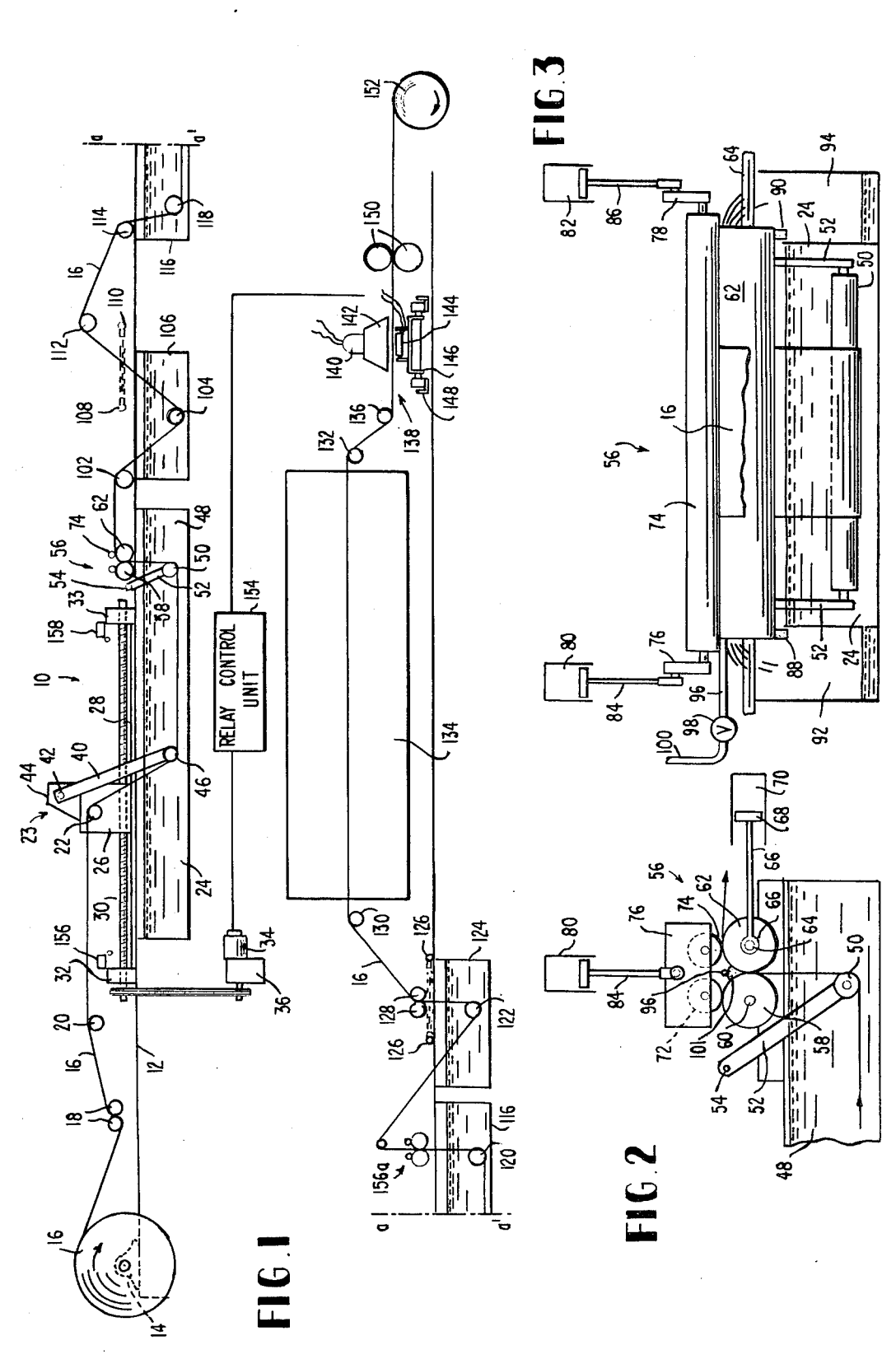
Figure 4:
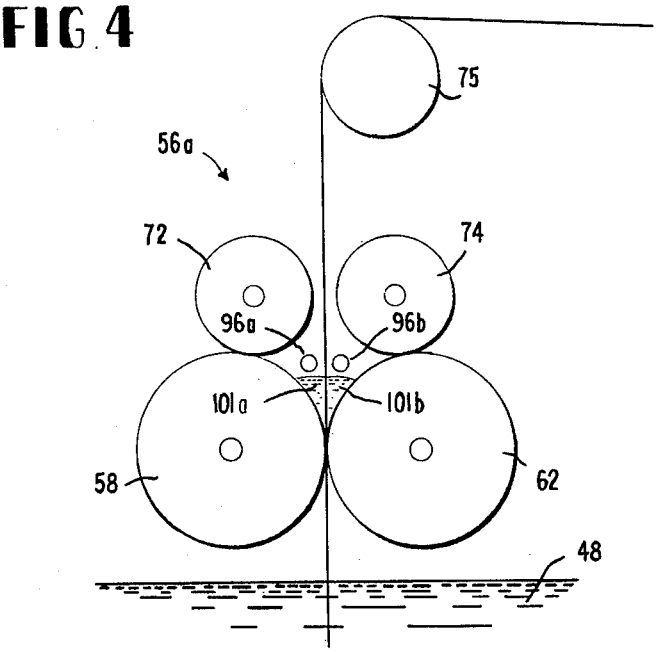
FIG. 4 is a fragmentary view similar to FIG. 2 and illustrating an alternate embodiment of the invention.

Referring now to the drawings in detail, the apparatus according to the present invention illustrated schematically in FIG. 1 is indicated generally by the reference numeral 10 and includes an elongated rigid frame assembly 12. Mounted on one end of frame 12 is a conventional brake-restrained roll support assembly 14 for supporting a roll of film 16 to be dyed and processed for use in the manufacture of polarized lenses. For this use, the film 16 would normally be a laminated structure consisting of a carrier sheet of cellulose aceto butyrate (CAB) having firmly adhered to its outer (upper) surface a mono-directional stretch-oriented polyvinyl alcohol (PVA) film. The film 16 is pulled from the roll by a pair of positively driven, rubber covered feed rolls 18 mounted on a frame 12. Preferably, the respective rolls 18 are movable relative to one another and are resiliently urged toward one another by a suitable means, such as pneumatic cylinders, not shown, with sufficient force to prevent slipping between the film and the roll surfaces during operation of the apparatus. Also, the rolls 18 are preferably driven by a suitable variable speed drive mechanism which permits accurate control of the speed of the film through the apparatus.

From the driven pinch rolls 18, the film 16 passes over the first idler roll 20 mounted in fixed position on the frame 12, and a second idler roll 22 mounted for reciprocable movement along the top of an elongated dye tank 24. Roll 22 is a part of a movable traverse assembly 23 and is supported by a pair of movable blocks 26 mounted on rails 28 extending one along each side edge of the tank 24. Since blocks 26 and the rails 28 on the opposed sides of the tank 24 are substantially identical, only one is shown in FIG. 1. Blocks 26 are moved along rails 23 by elongated threaded shafts 30, each journaled for rotation about an axis extending parallel to and above one of the rails 28 by a pair of bearing blocks 32, 33. The respective shafts 30 extend through threaded openings in the blocks 26 so that rotation of the shafts 20 is translated into linear sliding movement of the blocks along the rails 28. Shafts 30 are rotated about their respective axes by motor 34, acting through a suitable reduction gear 36 and a drive chain and sprocket assembly 38. A pair of limit switches 156–158 connected in the circuit to motor 34 limit the movement of the traverse assembly 23.

A pair of arms 40 are pivotally mounted one on each of the blocks 26, as by pins 42 and mounting brackets 44. The arms pivotally mount a guide roll 46 for movement between a raised position above the surface of the dye solution 48 within tank 24 and a lower position within the tank as shown in FIG. 1. Suitable stops, not shown, may be provided to limit the pivotal movement of arms 40 and roll 46.

A second guide roll 50 is pivotally mounted, as by arms 52 and pins 54, for movement between a raised position spaced above the surface of the dye 48 and a lowered position within the dye tank 24 as shown in FIG. 1. Preferably, the arms 40 and 52 are formed from a material such as stainless steel to resist the corrosive action of the dye solution, and the rolls 46 and 50 are preferably formed from a plastic material having a rubber coating on the film engaging surfaces. Similarly, any bearings used for mounting the rolls 46 and 50 are preferably of plastic construction to resist the corrosive action of the dye.

As best seen in FIGS. 2 and 3, an excess dye removing and rinsing assembly 56 is mounted on the end of the dye tank 24 above the guide roll 50. The assembly 56 comprises a first rubber covered roll 58 for rotation about a fixed axis spaced above and parallel to the top surface of the dye solution in tank 24 by a shaft 60 and suitable bearings, not shown. A second rubber covered roll 62 is supported for rotation about an axis parallel to and spaced horizontally from the axis of roll 58 by a second shaft 64 and bearings 66. The bearings 66 are mounted for limited horizontal movement toward and away from the roll 58 by rods 66 and pistons 68 mounted in fluid cylinders 70. The roll 58 is preferably driven for rotation about its axis by the same drive mechanism and at the same rate as the driven rolls 18; however, to avoid the possibility of applying excess tension to the film, roll 58 is preferably driven through a friction clutch drive, not shown, to permit slippage between the roll and its driving means. During operation of the apparatus, sufficient fluid pressure is applied to the pistons 68 to urge rolls 58 and 62 together with enough force to prevent slippage between the film and the roll surfaces.

A second pair of rolls 72, 74 are mounted for rotation about spaced, parallel, horizontal axes by a pair of vertically movable bracket members 76, 78. Brackets 76, 78 are moved between a lower position shown in FIG. 3 and a raised position spaced vertically thereabove by fluid cylinders 80, 82, respectively, acting through connecting rods 84, 86. In the lowered position shown in FIGS. 2 and 3, roll 72 is in contact with the top surface of roll 58, and roll 74 is in contact with the top surface of roll 62.

As indicated in FIG. 3, rolls 58, 62, 72 and 74 are slightly longer than the width of the dye tank 24, with the ends of the rolls projecting laterally outwardly from and spaced closely adjacent to the top edges of the tank 24. A pair of brushes 88, 90 engage the lower surface of the rolls 58, 62 adjacent the ends thereof outboard of the dye tank 24 for reasons more fully explained hereinbelow. Also, a pair of troughs 92, 94 are formed, one on each side of dye tank 24, adjacent the ends of squeeze rolls 58, 62, and suitable drains, not shown, are provided to drain liquid from these troughs.

An elongated spray bar 96 has one end connected, through valve 98, to a supply conduit 100, and has its other open end projecting above rolls 58, 62 for delivering a supply of rinsing liquid into the exit nip of these rolls. During operation of the apparatus, the rinsing liquid accumulates in a pool 101 in the exit nip of the rolls and flows axially therealong to be discharged over the ends of the rolls and into the respective troughs 92, 94 as indicated in FIG. 3. The brushes 88, 90 contacting the bottom surface of the rolls 58, 62 prevent any rinsing liquid from collecting and running along the bottom surface of the rolls and dripping into the dye solution 48 within tank 24. In the alternate embodiment of the invention illustrated in FIG. 4, two spray bars 96a, 96b are employed, one positioned on each side of a vertical plane extending between rolls 58, 62, and a guide roll 75 is mounted above roll 74 to guide the film 16 vertically between the two spray bars 96a, 96b so that both surfaces may be rinsed as the film emerges from the nip of the rolls 58, 62 through the pools of a rinsing liquid 101a and 101b.

Referring again to FIG. 1, as the dyed, rinsed film 16 leaves the dye removal assembly, it passes over a guide roll 102 then beneath a rubber surfaced plastic roll 104 mounted within a rinsing tank 106 in which a suitable rinsing liquid such as ordinary water is circulated to remove any adhering film of stain or dye not removed in the initial bath within the nip of the rolls 58, 62. As the film 16 emerges from the tank 106, spray bars 108, 110, positioned one on each side of the film direct streams of a further rinsing liquid such as demineralized water onto the plastic film to remove any mineral residue from the water bath in tank 106.

From the rinsing tank 106, the film 16 is guided over rolls 112, 114 into a fixing solution contained in tank 116. A pair of guide rolls 118, 120 guide the film through the fixing solution in tank 116 and upwardly into a second treatment solution removal assembly 156a substantially identical to assembly 56. From the assembly 156a, the dyed, fixed film is guided, by roll 122, through a further rinsing bath within rinse tank 124.

As the film leaves rinsing tank 124, it is further washed by spray nozzles 126, then passes through the nip of a pair of driven pinch rolls 128 and is directed, by guide rolls 130, 132 through a drying oven 134 where all moisture is removed from the surface of the dyed, fixed film.

From the oven 134, the dried film is guided, by roll 136, through a photoelectric sensing device 138 where the light transmission, and consequently the uniformity of the dyeing operation, is continuously monitored. The photoelectric apparatus 138 consists of a light source 140 which directs a beam of light through the film as it passes therebeneath. Preferably, the intensity of the light is accurately controlled by means of a constant voltage transformer and Variac, in a known manner, and an opaque hood 142 is provided to shield the film from all external light sources. A photoelectric sensing device 144 is mounted on a carriage 146 which, in turn, is supported for movement on a track 148 so that the entire assembly can be moved in a direction extending at right angles to the direction of travel of the stained film.

A final set of driven pinch rolls 150 draw the film through the photoelectric assembly, and the processed film is then wound on a suitable reel 152.

The output from the photoelectric sensing cell 144 may either be converted to a visual indication of the light transmitted through the film, or the percent of light transmission, which, in turn, may be employed by an operator to manually adjust, through the motor 34 and reduction gear assembly 36, the position of the traverse assembly 23 to thereby adjust the length of the bight of film submerged in the staining bath. Alternatively, the photoelectric signal may be employed, through a suitable time delay control circuit indicated generally at 154 to automatically control operation of the motor 34 to adjust the submersion time.

Figure 5:
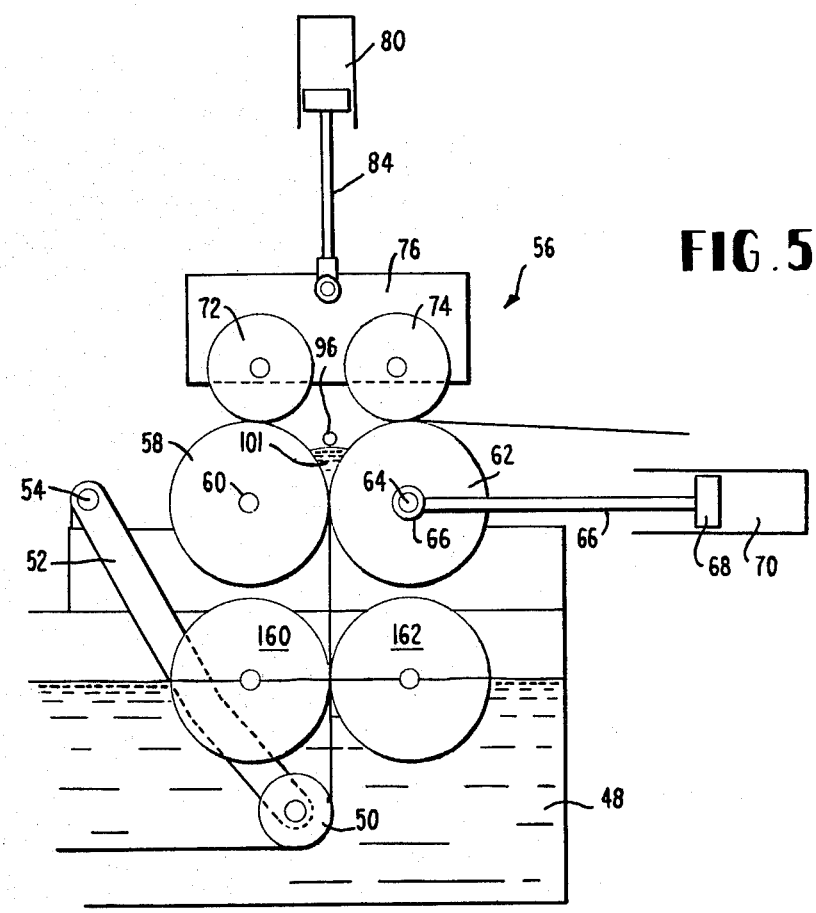
FIG. 5 is a view similar to FIG. 2 and illustrating still another embodiment of the invention.

In addition to the structure described above with reference to FIGS. 1–3, the embodiment of the invention shown in FIG. 5 includes an additional set of pinch rolls 160, 162 mounted by suitable bearings, not shown, within tank 24 for rotation about axes parallel to and spaced below the axes of rolls 58, 62. In this embodiment, the dye removing and rinsing assembly 56 is mounted slightly farther above the surface of the liquid 48 to permit rolls 160, 162 to be mounted thereunder. Rolls 160, 162, as all pinch roll pairs in the assembly, are driven at the same rate as feed rolls 18, preferably through a suitable friction clutch drive to permit slippage in the event of any slight variation in roll speed to thereby ensure against overstressing the film or slipping of the film in contact with a roll surface.

Rolls 160, 162 are preferably constructed from a corrosion-resistant plastic material having a rubber coating or sleeve on their film-engaging surfaces, and are mounted with their axes of rotation in a common horizontal plane extending closely above the surface of the liquid 48 in tank 24 with the lower portion of the rolls extending into the liquid. In this position, the nip of the rolls, i.e., that portion in contact with one another, extends slightly above the surface of the solution in the tank so that the film 16 passing upward through the nip has the treatment liquid rolled from its surfaces as it emerges from the bath. The film then passes upward directly into the nip of rolls 58, 62 and proceeds through the apparatus in the same manner described above with regard to the embodiment of FIGS. 1–4.

In operation of the apparatus described above to dye a stretch oriented PVA film laminated onto a CAB film, a leader strip of suitable material is attached to the end of the laminated film and is threaded through the apparatus, and rolls 46 and 50 are lowered into operating position. With all the driven pinch rolls in place and the rinsing water valves open, the drive motor is started and the speed of the film is brought up to operating speed which might be within the range of about 12 to 30 feet per minute, and preferably about 20 feet per minute. As soon as the PVA film reaches the photoelectric sensing unit, (assuming manual control of the traverse assembly positioning apparatus for adjusting the submersion time) the operator reads the visual signal from the photoelectric sensing unit and adjusts the submersion time of the film by advancing or retarding motor 34 to thereby adjust the length of the bight of film in the dye solution to obtain the desired degree of staining. As an alternative, the operator may increase or decrease the line speed of the film so that the time of submersion in the dye bath is varied. However, this is less desirable than altering the length of the bight of film submerged in the tank since changing the speed also affects the washing, drying and fixing operation. It should also be apparent that the rate of the film, stated above as preferably being about 20 feet per minute for PVA film, may be varied over a wide range depending, for example, on the type of film or process, the configuration and/or size of the apparatus used, and numerous other variables.

When the time of submersion of the film in the dye bath is controlled automatically, the output signal from the photoelectric cell is fed to a relay control unit which, in turn, controls the motor 34 through a time delay relay system. The time delay feature is necessary to allow for the distance between the dye bath and the photoelectric control unit, and to avoid excessive hunting due to minor variations or imperfections in the film. Alternatively, of course, the signal from the photoelectric cell could be employed to vary the speed of the film through the apparatus.

In dyeing a laminated CAB-PVA film with iodine or other dichroic dyes, the exposed surface of the CAB film normally is not affected by the dye solution, nor does the dye adhere to this film as the film is drawn from the bath. However, the dye solution does adhere to the PVA surface, often in the form of globules or droplets which continue the staining process until they are removed. Accordingly, it is important that the film leaving the dye bath be passed through the nip of the squeeze rolls 58, 62 as quickly as possible. By employing squeeze rolls 58, 62 having a diameter of 2½ inches, and positioning these rolls with their bottom surface approximately 1 inch above the surface of the dye bath, and by moving the film at a rate of approximately 20 feet per minute through the apparatus, any droplets adhering to the film as it leaves the dye bath are mechanically rolled from the surface within approximately ½ second. This time will, of course, vary with the diameter of the rolls, the force with which they are pressed together by the pistons 68, and the distance above the surface of the liquid as well as with the film speed. Obviously, these different factors may be varied within limits to produce a slightly greater or less lapse time between emergence of the film from the dye bath and the mechanical rolling operation so long as this time is not so great as to produce objectionable stain variations. It has been found, for example, that for iodine staining of PVA film, no discernible variation in the degree of staining are noted for lapsed times of up to about 1 second, while minor variations may become evident when this lapsed time is increased from about 1 to about 5 seconds.

Since most dichroic dye solutions used to stain PVA film do not effect or adhere to the surface of the CAB film, it is normally not necessary to rinse this side of the laminated film in the squeeze roll nips. In this case, the film can be fed through the nip of roll 62 and roll 74 as shown in FIG. 3 so that the rinse water fed through the spray pipe 96 is mechanically rolled from the PVA surface of the film. However, where it is desirable to wash both surfaces of the film as it emerges from the squeeze rolls 58, 62, the embodiment of the invention illustrated in FIG. 4 is employed.

As indicated above, the dyed film leaving the fixing bath 116 is directed upwardly through a second liquid removal and rinsing apparatus which may be either the type illustrated in FIG. 2 or FIG. 4 as desired. Also, it is believed apparent that a traverse mechanism similar to that employed in the dye bath may be employed to vary the length of the bight of film in the fixing tank if desired.

While we have disclosed and described preferred embodiments of our invention, we wish it understood that we do not intend to be restricted solely thereto, but that we do intend to include all embodiments thereof which would be apparent to one skilled in the art and which come within the spirit and scope of our invention.

We claim:

1. An apparatus for processing thermoplastic film including a receptacle for containing a bath of a liquid treatment solution, driven roll means for drawing a length of film to be processed longitudinally through the apparatus, and guide roll means for guiding a bight of the moving film through said bath, the improvement comprising a first pair of squeeze rolls mounted in closely spaced relation to the top surface of said liquid dye solution and resiliently urged into engagement with one another, means for drawing said film upwardly from said dye bath through the nip of said pair of squeeze rolls to mechanically roll any adhering dye solution from the surface of said film, and an elongated spray bar extending over the exit nip of said pair of squeeze rolls for supplying a rinsing liquid into the exit side of said nip to rinse the surface of the film passing therethrough and permitting the rinsing liquid to continuously flow from said exit side of said nip at the ends of said squeeze rolls.

2. The apparatus as defined in claim 1 further comprising means for preventing said rinsing liquid from falling into and mixing with said liquid treatment solution.

3. In the apparatus as defined in claim 1, the further improvement wherein said guide roll means comprises a movable guide roll mounted within said receptacle, and means for moving said movable guide roll to vary the length of said bight of film submerged in the liquid treatment solution.

4. The apparatus as defined in claim 1 wherein said means for preventing said rinsing liquid from falling into said treatment solution comprises a pair of idler rolls, and means resiliently urging said idler rolls into engagement with said squeeze rolls near the upper surface thereof.

5. The apparatus as defined in claim 1 further comprising means engaging the bottom surface of said squeeze rolls near the ends thereof to prevent rinsing liquid from running back along said bottom surface.

6. In the apparatus as defined in claim 1, the further improvement comprising photoelectric cell means for monitoring the transparency of said film at a point downstream from said liquid treatment bath, and means responsive to said photoelectric cell means for varying the length of the bight of film submerged within said liquid treatment bath in accordance with the transparency of the dyed film.

7. The apparatus as defined in claim 6 wherein said guide roll means comprises a movable guide roll mounted within said receptacle, and wherein said means for varying the length of said bight of film comprises means responsive to said photoelectric cell for moving said movable guide roll.

8. The apparatus as defined in claim 1 further comprising a second set of squeeze rolls mounted between said first set of squeeze rolls and said treatment solution, said second set of squeeze rolls being partially submerged within said treatment solution and having their nip extending slightly above the surface thereof whereby film passing through said bath and upwardly between said second set of squeeze rolls will have any adhering bath liquid rolled from the surface thereof as it emerges from the treatment bath.

9. An apparatus for processing thermoplastic film including a receptacle for containing a bath of a liquid treatment solution, driven roll means for drawing a length of film to be processed longitudinally through the apparatus, and guide roll means for guiding a bight of the moving film through said bath, the improvement comprising a first pair of squeeze rolls mounted in closely spaced relation to the top surface of said liquid dye solution and resiliently urged into engagement with one another, means for drawing said film upwardly from said dye bath through the nip of said pair of squeeze rolls to mechanically roll any adhering dye solution from the surface of said film, conduit means for supplying a rinsing liquid into the exit side of said nip to rinse the surface of the film passing therethrough and permitting the rinsing liquid to continuously flow from said exit side of said nip at the ends of said squeeze rolls, a pair of idler rolls, means resiliently urging said idler rolls into engagement with said squeeze rolls near the upper surface thereof for preventing said rinsing liquid from falling into and mixing with said liquid dye solution, and means engaging the bottom surface of said squeeze rolls near the ends thereof to prevent rinsing liquid from running back along said bottom surface, said guide roll means comprising a movable guide roll mounted within said receptacle, and means for moving said movable guide roll to vary the length of said bight of film submerged in the liquid treatment solution.

* * * * *